United States Patent [19]

Pauls

[11] Patent Number: 6,013,685

[45] Date of Patent: Jan. 11, 2000

[54] PROCESS FOR RECYCLING PACKINGS

[75] Inventor: Mathias Pauls, Appenzell, Switzerland

[73] Assignee: Rathor AG, Appenzell, Switzerland

[21] Appl. No.: 08/776,485

[22] PCT Filed: Jul. 22, 1995

[86] PCT No.: PCT/EP95/02907

§ 371 Date: Apr. 18, 1997

§ 102(e) Date: Apr. 18, 1997

[87] PCT Pub. No.: WO96/03231

PCT Pub. Date: Feb. 8, 1996

Related U.S. Application Data

[63] Continuation of application No. PCT/EP94/02483, Jul. 28, 1994.
[51] Int. Cl.[7] .................................. C08J 11/04; C08J 3/00
[52] U.S. Cl. .............................. 521/49; 521/49.5; 521/53; 528/494; 528/495; 528/503; 241/DIG. 37
[58] Field of Search ................................ 521/49, 49.5, 53; 528/494, 495, 503; 241/DIG. 37

[56] References Cited

U.S. PATENT DOCUMENTS

| | | | |
|---|---|---|---|
| 4,339,358 | 7/1982 | Schutz | 521/49.5 |
| 5,288,760 | 2/1994 | Morgan | 521/40 |
| 5,338,763 | 8/1994 | Munzamy | 521/49.5 |

*Primary Examiner*—James J. Seidleck
*Assistant Examiner*—Olga Asinovsky
*Attorney, Agent, or Firm*—Townsend and Townsend and Crew LLP

[57] ABSTRACT

A process for recycling of packings containing reactive residues wherein the packings are introduced into a cold zone and cooled until the residues contained therein solidify and are then crushed in the cooled state, the crushed packings are divided into a fraction containing the reactive residues and at least one further fraction, the residue-containing fraction is introduced into a mixing zone into which an agent reactive with the residues is simultaneously introduced, optionally together with a catalyst, the temperature in the mixing zone being held below the softening temperature of the residues and the reactive agent, and the resulting mixture of residue-containing fraction and reactive agent and optionally catalyst is brought to a temperature sufficient for reaction and reacted in a reaction zone.

14 Claims, 5 Drawing Sheets

PROCESS FOR RECYCLING PACKINGS

This is a continuation of PCT/EP94/02483 filed Jul. 28, 1994.

BACKGROUND OF THE INVENTION

This invention relates to a process for recycling packings containing reactive residues, in particular cartridges for producing polyurethane foam. In the process the packing materials are recovered and the residues contained therein converted into reusable products.

Residue-containing packings as occur for example in great quantities in the form of wholly or partly empty cartridges are increasingly becoming a disposal problem. They cannot be dumped on disposal sites for reasons of environmental protection since, the residues contained therein can pass into the atmosphere, the soil or the groundwater and lead to considerable damage there. The same holds for burning, which is frequently incomplete in particular with chemicotechnical products and produces great quantities of pollutants which can be bound only by elaborate measures, if at all. Burning thus leads to a great reduction in the volume of waste but does not necessarily solve the pollution problem.

Special problems arise when the residues contained in the packings are themselves reactive and possible even toxic products, as is the case for example with isocyanate-containing prepolymers for polyurethane foams. The same holds for other reactive plastic products, for example self-curing or hardenable mixtures for coatings, adhesive mixtures, etc. In the following the problem will be discussed in relation to the disposal of prepolymer-containing cartridges for producing polyurethane foams, this case being given only as an example.

Polyurethane foams have become widely used in many fields. They are commonly used particularly in the construction industry for sealing and insulating, as well as in other technical fields. Polyurethane foams are commonly discharged from cartridges containing a polyurethane prepolymer together with required additives. These cartridges cannot be reused. On the other hand, they are problem waste which cannot be disposed of in the normal way.

In accordance with efforts to limit household and industrial waste, measures are being increasingly discussed and implemented to force manufacturers to take back their product packaging after use and ensure its reuse or disposal themselves. Such measures have made it necessary to find ways of treating such waste economically. The treatment of returned cartridges for polyurethane foam production involves a number of problems which complicate economic recycling. For example, some returned cartridges can be under pressure due to the penetration of moisture during improper storage or treatment, which makes both opening and burning a problem. Furthermore the cartridges have different filling conditions, ranging from overaged cartridges virtually full of prepolymer which cannot be discharged due to a blocked valve, to virtually empty cartridges with only a remainder of prepolymer adhering to the edges in an uncrosslinked to crosslinked state.

Up to now a number of processes have become known for recycling packings, including aerosol cans for polyurethane foam production. For example it has been proposed to pass pressure cans via a sluice system into a plant under inert gas and crush them there. Further, processes have become known for passing aerosol cans into a plant, crushing them there and extracting the ingredients with suitable solvents. In these processes both the packing materials and the ingredients (prepolymer, propellant) are recovered.

However these known processes, some of which are quite efficient and in use, are capable of being improved with regard to industrial safety, process control and efficiency. It is problematic to separate the residues contained in the packings in simple fashion and direct them to suitable reuse. Further problems arise from the fact that the packings contain toxicologically unsafe substances as well as combustible solvents which can yield explosive gas mixtures after opening. In particular these processes are designed for recycling propellant-containing aerosol cans, however, which limits their applicability for pressureless cartridges.

SUMMARY OF THE INVENTION

The invention is therefore based on the problem of providing a process for recycling packings, for example containers holding polyurethane prepolymers in particular for foam production but also for adhesive purposes, together with solvents, and recovering the useful materials contained therein without releasing unhealthy and pollutive ingredients in uncontrolled fashion and without the course of the process being burdened by reactive components released from the packings. The process should meet the requirements for industrial safety and in particular convert reactive residues still contained in the packings into a form suitable for direct further processing.

This problem is solved according to the invention by a process of the above-mentioned type wherein the packings are introduced into a cold zone and cooled until residues contained therein solidify, the packings are then crushed in the cooled state, the crushed packings are divided into a fraction containing the reactive residues and at least one further fraction, the residue-containing fraction is introduced into a mixing zone into which an agent reactive with the residues is simultaneously introduced, optionally together with a catalyst, the temperature in the mixing zone being held below the softening temperature of the residues and the reactive agent, and the resulting mixture of residue-containing fraction and reactive agent and optionally catalyst is brought to a temperature sufficient for reaction and reacted in a reaction zone.

The inventive process makes it possible to open and process packings in a fully safe way. In particular it permits the various materials contained in the packings to be separated safely. The reactive residues, for example isocyanate-containing prepolymers in cartridges for producing polyurethane foam, are treated in a safe manner. Due to the freezing of the ingredients contained in the packings there is neither a reaction-induced pressure increase in the process nor undesirable reaction between reactive components. At the temperatures prevailing in the process the presence of water is also harmless. The two latter points are of importance in treating isocyanate-containing products when for example damaged packings carry water into the process. At the same time, reactive second components contained in so-called 2C foams, for example glycols, carboxylic acids or water, can be easily introduced into the process. The inventive process is thus suitable for treating both cartridges for 1C and 2C foams and transitional forms between the two simultaneously.

In the inventive process the packings, for example cartridges, are first introduced into a cold zone and cooled therein until the residues contained, including any low-boiling solvents solidify. Temperatures lower than −80° C. to −100° C. are generally sufficient for this purpose, but one expediently works in liquid nitrogen as a cooling medium. In this case it is important that the process be performed in the absence of oxygen to avoid condensation of liquid oxygen which could have an adverse effect in later process steps.

The packings are expediently introduced into the cold zone using a cellular wheel pneumatic sluice which introduces the packing into a guide cage extending in the cooling medium. In the cold zone the packing is then guided a sufficient distance through the cooling medium to obtain complete freezing.

When the desired temperature is reached, generally the temperature of liquid nitrogen, the packings are guided into the crushing zone where they are crushed in the cold state. The temperatures here should expediently be under $-80°$ C. to $-100°$ C.; it might be necessary to spray in liquid nitrogen or cold gaseous nitrogen.

Crushing is expediently done in a hammer mill working against a sifter. This achieves a shaking and fulling effect which not only crushes to a desired particle size but also separates the various materials: metal, paper, plastic and ingredients. It has surprisingly turned out that the packing materials (metal, paper and plastic) can thereby be separated extremely well from the ingredients (reactive residues and solvents/additives in powder form), the ingredients being obtained as fine powder.

In a subsequent separating step the crushed packings are divided into a least two fractions, one of which contains the reactive residues including propellant in a solid state. This separating step expediently uses a sifter, preferably a riddle sifter, through which the fine components (mainly reactive residues and solvent) fall. Metal parts are separated with magnetic methods, large plastic parts and scraps of paper sieved out on the riddle sifter.

The frozen ingredients from reactive residues and solvent pass from the separating zone into a mixing zone into which an agent reactive with the residues is simultaneously introduced. Temperatures lower than $-80°$ C. to $-100°$ C. also prevail in this mixing zone to ensure the frozen state of the introduced materials and solidify the sprayed-in reactive agent immediately into a fine powder. This permits formation of a uniform mixture of ingredients in powder form and reactive agent, which cannot react due to the prevailing temperature conditions. The temperatures in the mixing zone are in any case below the melting point of both the residues and the reactive agent.

A spray tower is expediently used as a mixing zone, the frozen ingredients falling in from above. The reactive agent is sprayed into this powder stream from lateral nozzles, preferably together with cold gaseous nitrogen to ensure the necessary low temperatures. It is expedient to precool the reactive agent but it must remain sprayable.

It can be expedient to spray in the reactive agent together with a catalyst which promotes the reaction with the reactive residues of the packings. This is generally unnecessary with isocyanate-containing prepolymers, however, since the isocyanate-containing mixtures already contain such catalysts.

The powdery mixture of ingredients and reactive agent and optionally catalyst is then guided into a reaction zone which consists for example of a conveyer belt moving continuously under the mixing zone. The powder collecting here is then brought to a temperature sufficient for reaction is order to react. Any solvents contained evaporate at this point and are condensed out at a suitable place, which is no problem when nitrogen is used as a cooling medium. To give the reaction product the desired form the conveyer belt can have lateral limits. For separating the reaction product from the conveyer belt is it possible to provide parting means, for example suitable coatings or release paper. The heating in the reaction zone is expediently done with microwaves, which cause fast direct heating of the powder material from the inside to the outside so that uniform degassing occurs.

Following the reaction zone one can provide further processing and treating zones as well as a final sluice for passing out the reacted material.

As mentioned above, the inventive process is especially suitable for recycling residue-containing polyurethane foam cartridges. In this case the reactive agent is in particular a hydroxy compound, for example water, ethylene glycol, propylene glycol, glycerol, oligomers and mixtures thereof as well as derivatives thereof. Ethylene glycol, water and polyether alcohols are preferred, whereby in any case at least two reactive hydrogen atoms should be present. Polycarboxylic acids can likewise be used. Especially suitable polyether alcohols are the so-called Jeffamines™.

In recycling packings for producing polyurethane foams it is advantageous to convert the isocyanate-containing prepolymers in the process itself into foam materials which can be used for example for insulating purposes. The inventive process can thus continuously produce insulation boards, whereby the propellants contained in the powder produced in the mixing zone promote foam formation. It is also readily possible to produce foils or to admix additives, for example cellulose-containing materials, and then press these mixtures into composite materials during or after reaction. However it is preferable to produce granules from reacted material which are further processed later.

The inventive process is especially suitable for recycling pressureless polyurethane foam cartridges which are emptied on site using a suitable pistol and then returned to the manufacturer for recycling. These cartridges, which are used both for 1C and for 2C foams, are pressureless during storage and generally contain no expanding or foaming agent. If an improvement in foaming behavior is necessary and this improvement cannot be achieved by using water as the second component, low-boiling solvents can be present, for example pentane, which are liquid at normal temperature but evaporate with the second component at the reaction temperatures of the prepolymer and produce an expanding effect. The inventive process can likewise be used for aerosol cans for polyurethane foam production if an effective separation of propellant is ensured in the area of the reaction zone. The process is thus fundamentally suitable for packings which also contain expanding agents and achieve an expanding and/or foaming effect, optionally in accordance with temperature.

Figure 1:
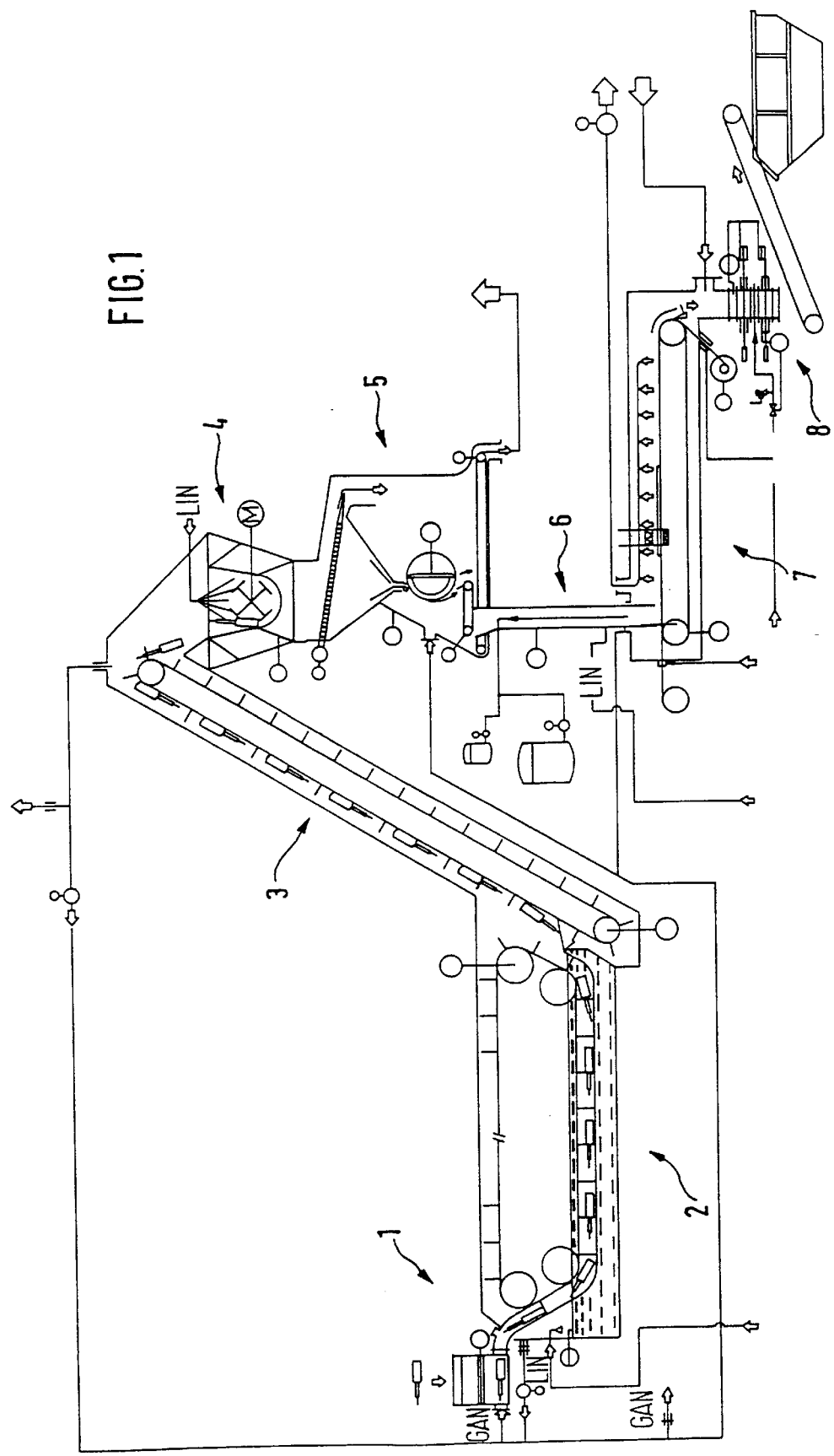
FIG. 1 shows schematically an embodiment of a plant for carrying out the inventive process.
Figure 2:
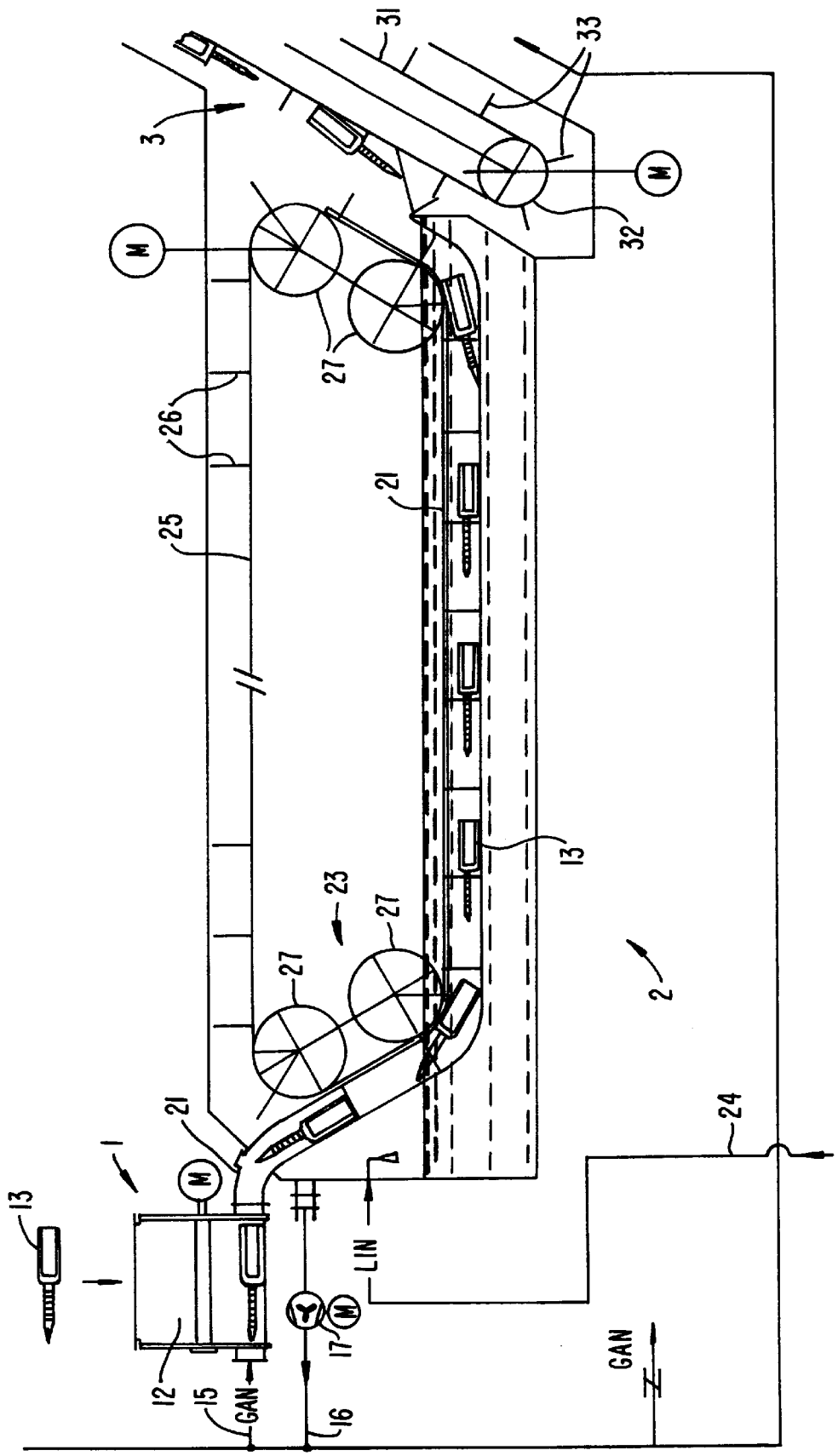
FIG. 2 shows the entrance area of the plant according to FIG. 1.
Figure 5:
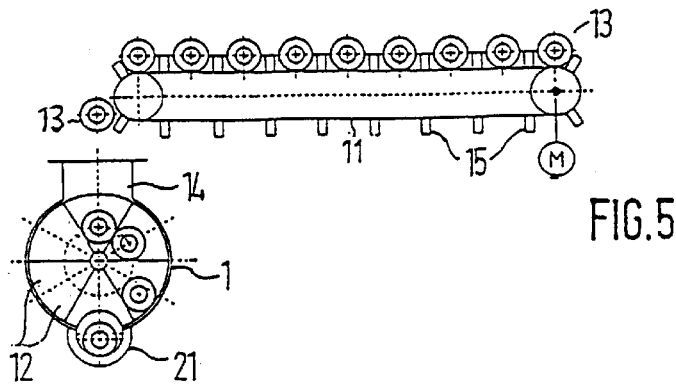
FIG. 5 shows details of the feed by the cellular wheel sluice.

The view of an embodiment of the inventive recycling plant shown in FIG. 1 entry sluice 1 which is fed cartridges 13 to be treated via conveyor and sorting belt 11 (FIG. 5). The entry sluice is preferably formed as a cellular wheel pneumatic sluice into chambers 12 of which cartridges 13 fall from above via feed hopper 14 (FIG. 2). Rotation of cellular wheel 1 causes the cartridges to pass into the lower area of the sluice and be ejected laterally with the help of gaseous nitrogen GAN from pipe 15. To make this possible the cellular wheel rotates in a gastight container open at the top which can be subjected to pressurized gaseous nitrogen GAN from one side in its lower area so that cartridge 13 therein can be ejected on the opposite side into guide system 21. The nitrogen supply via pipe 15 is preferably ensured with gaseous nitrogen from cold bath 2. Obviously the rotational speed of cellular when 1 and the pressure surges from nitrogen pipe 15 for ejecting the cartridges from the cellular wheel are mutually coordinated. The cellular wheel has for this purpose a measuring sensor marked M.

Figure 4:
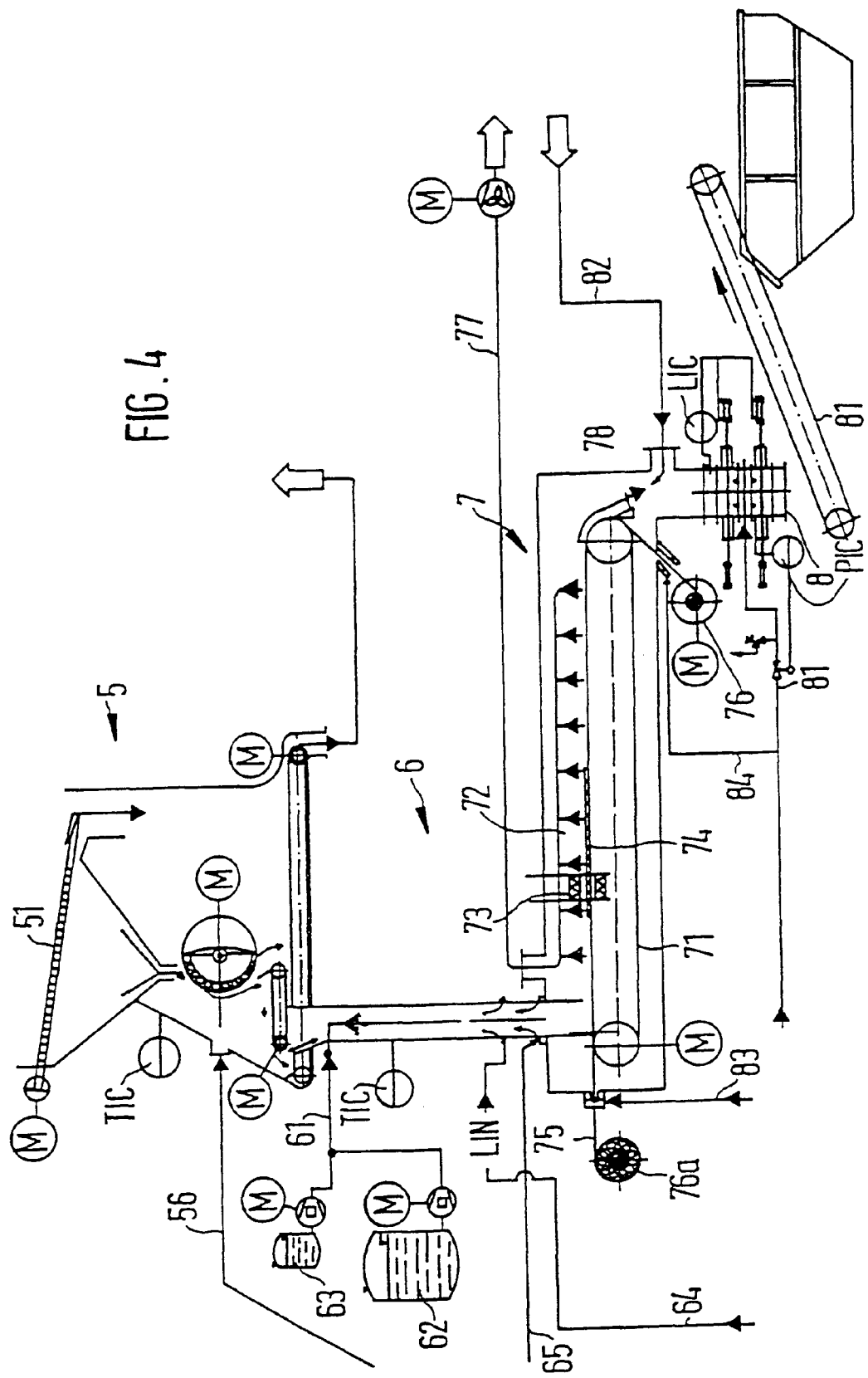
FIG. 4 shows the mixing and reaction zones of the plant according to FIG. 1.

From the cellular wheel the cartridges pass via guide 21 into cold bath 2 filled with liquid nitrogen. Guide 21 expediently consists of an elongate basket construction open on all sides which permits unhindered admission of liquid nitrogen and escape of gaseous nitrogen. Details of guide 21 and transport device 23 for transporting cartridges 13 will be described more closely below in connection with FIGS. 4 and 5.

On their way through cold bath 2, which is supplied with fresh liquid nitrogen LIN in accordance with level via pipe 24 and has measuring sensor LIC for checking level, cartridges 13 are cooled to the bath temperature. The cage structure of guide 21 ensures free admission of cooling medium and quick discharge of produced gaseous nitrogen. Gaseous nitrogen is removed from the bath area via pipe 16 with the help of ventilator 17. The length of guide 21 and the transport speed are adjusted so that cartridges 13 are cooled to a sufficiently low temperature of at least −80° C. to −100° C. even when completely filled with remainder.

Cartridges 13 are transported in guide 21 with the help of transport device 23 expediently consisting of circulating transport belt 25 with protruding transport forks 26 which engage in guide 21 from above and push cartridges 13 guided therein ahead of themselves. Transport rolls 27 ensure precise guidance of transport forks 26. Forks 26 are disposed on transport belt 25 at intervals coordinated with the size of cartridges 13 to be transported. Measuring unit M serves to monitor the transport speed and its coordination with the feed rate of cartridges 13.

Figure 3:
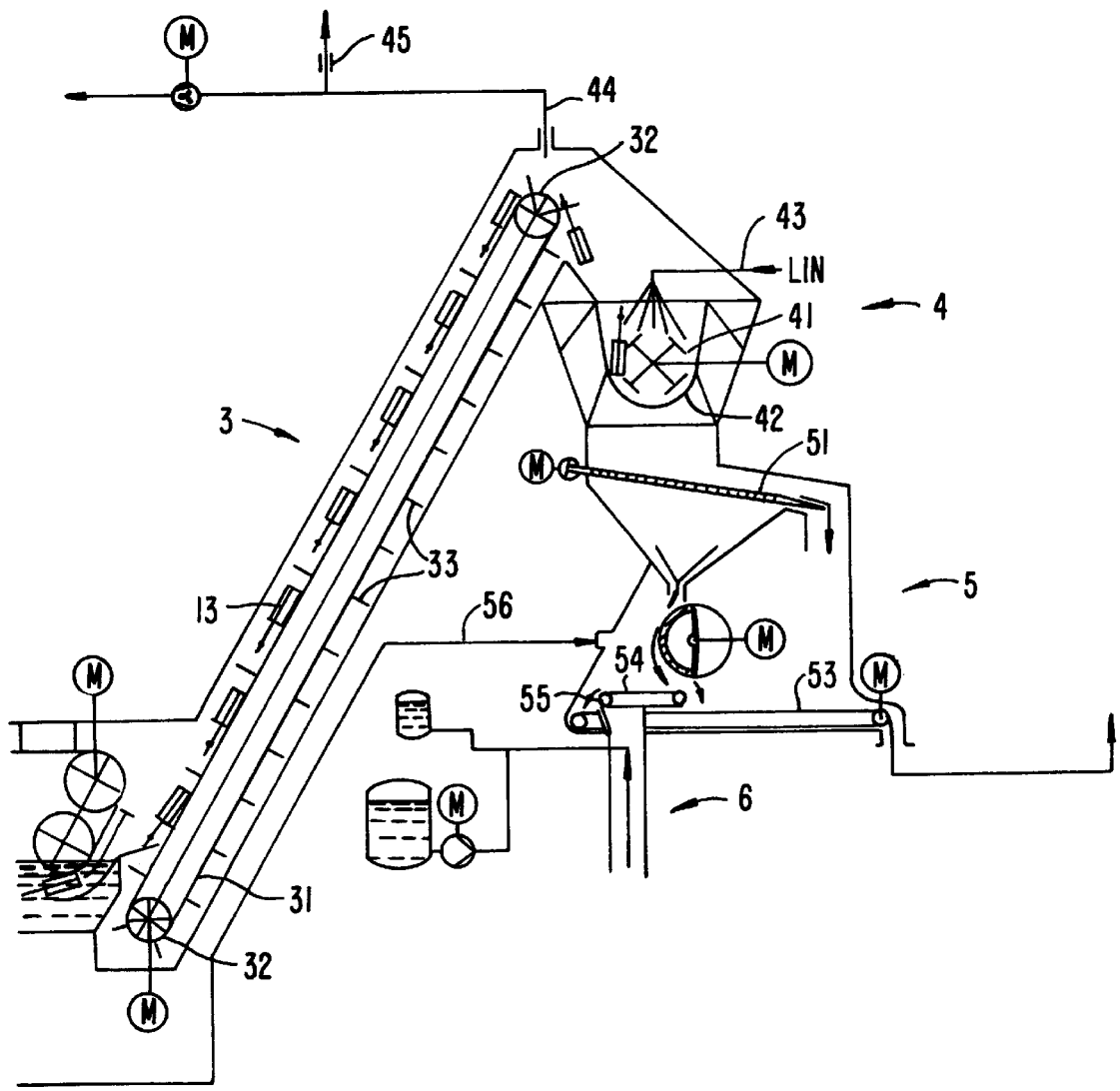
FIG. 3 shows the conveying, crushing and sorting part of the plant according to FIG. 1.

After running through cold bath 2 cartridges 13 pass out of guide 21 into conveying device 3 (FIG. 3) in the form of circulating conveyor belt 31 having transport segments coordinated with the size of cartridges 13. Conveying device 3 is preferably formed as a steep conveyor which receives cartridges 13 in the segments formed by transport forks 33 disposed at regular intervals and releases them overhead into crushing device 4. The conveyor belt is guided via rolls 32 provided with measuring unit M for monitoring and controlling the conveying speed.

Crushing device 4 consists of a shredder or preferably hammer mill 41. Hammer mill 41 preferably works against a sifter to guarantee a certain particle size of the crushed material. Sifter 42 simultaneously produces a fulling effect which promotes separation of the ingredients embrittled by the cold from the container material. Obviously one can add cooling medium, preferably liquid nitrogen LIN, via pipe 43 for maintaining the necessary low temperatures of −80° C. to −100° C. if temperature check TK indicates an inadmissible rise in temperature. The working speed is checked and controlled via measuring sensor M. Gaseous nitrogen is removed via pipe 44 and recycled or blown off via valve 45.

From crushing device 4 the crushed material passes into sorting device 5. This consists first of riddle sifter 51 on which coarse parts are separated from fine parts. Coarse parts are mainly the crushed materials of the container which are shaken off on inclined sifter 51 and discharged from the process via a sluice not shown.

Powdery ingredients and fine parts of the container pass through riddle sifter 51 onto first magnetic separator 52 which separates remaining iron and aluminum components from plastic particles and ingredients. On first magnetic separator 52 magnetic components are first separated and fed to first transport belt 53 which also receives the metal and plastic parts shaken off by sifter 51. Second transport belt 54 receives plastics, ingredients and nonmagnetic metal parts, which are divided into metallic and nonmetallic fractions via second magnetic separator 55 coupled with the transport belt. The metallic fractions pass onto first transport belt 53, the nonmetallic are guided directly into spray tower 6. Cold gaseous nitrogen can be supplied via pipe 56 if temperature check TIC indicates an inadmissible rise in temperature. Measuring sensors M check the working speed of all moving parts of separating system 5. If the cartridges consist entirely of nonmetallic materials the magnetic separators can naturally be dispensed with.

Obviously a temperature of no more than −80° C. to −100° C. is ensured both in the crushing plant and in the sorting device by suitable feeding pipes for cooling medium, preferably nitrogen in gaseous or liquid form.

The powdery ingredients and plastic parts passing into spray tower 6 (FIG. 4), and having a temperature of no more than −80° C. to −100° C. so that solvents contained therein are also present in a solid state, are mixed with reacting medium and optionally catalyst sprayed into the upper area of spray tower 6 via feed 61. The reacting medium, preferably ethylene glycol, is located in the liquid state in supply tank 62, the catalyst in supply tank 63. Both tanks have metering units coordinated therewith.

Reacting medium from tank 62 and catalyst from tank 63 are sprayed into spray tower 6 via pipe 61 in dosed relation to the reactive ingredients, whereby a precooling stretch can be provided in the course of feeding pipe 61 for cooling the materials to a beneficial temperature (above melting point). However, the spray material solidifies within the spray tower itself at the temperatures of less than −80° C. to −100° C. prevailing there. For maintaining the temperature in the spray tower it is therefore expedient to introduce cooling medium additionally, for example liquid nitrogen LIN via pipe 64 or gaseous nitrogen via pipe 65, if temperature check TIC indicates a need therefore. It is expedient to spray the cooling medium into the lower areas of the spray tower to ensure additional swirling and mixture of reactive compound, catalyst and reactive can content by cold nitrogen rising in spray tower 6.

From spray tower 6 the mixture of reactive cartridge content, reactive compound and catalyst passes in powder form into reaction space 7. Within reaction space 7 there is reaction belt 71 for receiving the falling material from spray tower 6 and guiding it into actual reaction zone 72 where the reaction is induced by heat. For this purpose heat elements 73 are disposed above conveyer belt 71 for heating the reaction material on conveyer belt 72 with microwaves or infrared rays to a temperature sufficient for reaction, for example room temperature or thereabove.

To prevent reaction material 74, i.e. the mixture of reactive cartridge content, reactive compound and catalyst, from sticking to conveyer belt 71 it may be expedient to cover the conveyer belt with separating foil 75 which is wound off roll 76a and onto second roll 76b. The separating foil is optionally reusable.

On conveyer belt 71 the reaction material reacts into the particular product desired. At the same time solvents and adsorptively bound cooling medium nitrogen still contained in the mixture from the spray tower are released and sucked off via pipe 77 and directed to separation and solvent recovery (not shown). In the presence, or upon formation, of a foaming agent, such as pentane or $CO_2$, the escape from reaction material 74 causes partial foaming of the reaction material, which is not undesirable for certain purposes.

At the end of conveyer belt 71 there is scraper 78 for detaching the reacted reaction material from the conveyer belt or separating foil, it being passed out of the process via product sluice 8 and taken away via conveyer belt 81. Nitrogen pipes 81 and 82 regulate the protective gas supply in the sluice area, the protective gas used being expediently nitrogen, which need not be cooled. Further nitrogen pipes 83 and 84 in the area of the entrance and exit of separating foil 75 prevent oxygen from entering the system in this area. It is also unnecessary to sue cool nitrogen here.

Obviously the inventive process is performed in a cold- and heat-insulated plant. In particular the entrance of oxygen must also be prevented in order to prevent liquid oxygen from condensing into cold bath 2. It is of advantage for the gas distribution to perform the entire process including spray tower 6 at temperatures at which solvent and foaming agent exist in a solid state. This permits them to be removed centrally via suction pipe 77 in reaction space 7 and directed to recovery. The reacted/cured polyurethane material emerging from the process in product sluice 8 can be directed to any desired further use in the form of granules. Possible uses are for example for insulating materials and in composite materials.

FIG. 5 shows details of the sluice system at the entry of the process, the cellular wheel pneumatic sluice being rotated 90° relative to the view of FIGS. 1 and 2.

Cartridges 13 with polyurethane prepolymer residues intended for the process are introduced via conveyor and sorting belt 11 to cells 12 of cellular wheel pneumatic sluice 1. Feed hopper 14, under which the sluice rotates away, ensures accurate introduction of cartridges 13.

Conveyor and sorting belt 11 expediently has ribs or forks 15 for separating cartridges 13 transported on the conveyer belt from one another. One can thus exactly coordinate the cycle of cartridge release with the transport speed of cellular wheel sluice 1 and the transport cycle in guide 21 of cold bath 2 at a given conveying speed. The fixing of a cycle further allows cartridges 13 to be discharged from sluice 1 in precisely timed fashion with the help of pressurized nitrogen through pipe 15 (FIG. 2).

As evident from FIG. 5, pneumatic sluice 1 opens at its lower rend (opposite feed hopper 14) into guide 21 into which the cartridges slide, being ejected toward transport device 23 with the help of the pressure surge from pipe 15.

Figure 6:
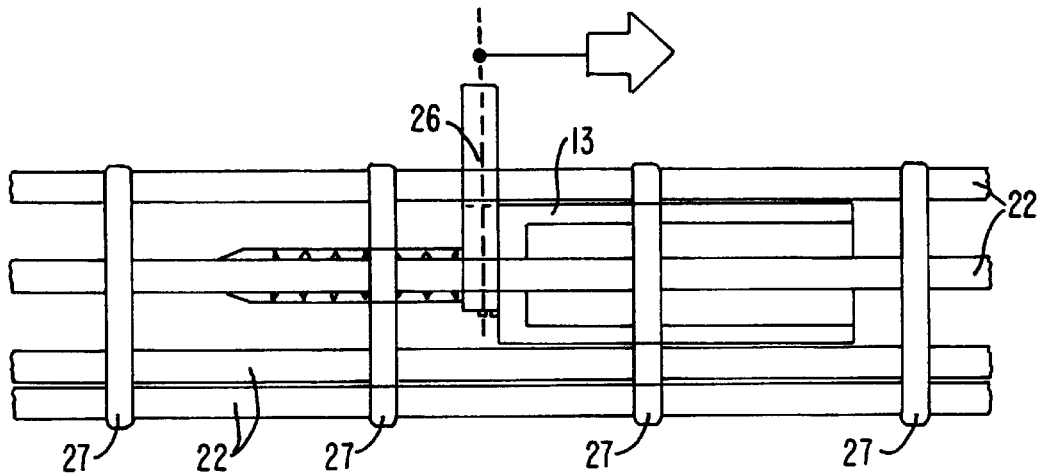
FIG. 6 shows details of the transport system guide in a horizontal projection.
Figure 7:
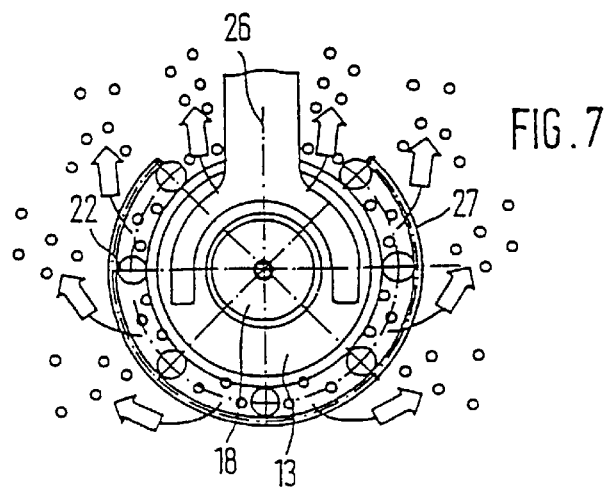
FIG. 7 shows the guide of FIG. 6 in cross section.

FIGS. 6 and 7 show details of guide 21 and transport device 23 for transporting cartridges 13 within guide 21.

Guide 21 has altogether an elongate, cage- or basket-like structure. The guide consists substantially of parallel guide rails 22 which leave enough room therebetween for the admission of liquid nitrogen and the escape of evaporated nitrogen. Guide rails 22 are held together by fixing rings 27 on the outside such that their relative position to one other is fixed. The fixing rings encompass entire guide 21 with the exception of the upper end, where the space between two guide rails 22 remains free so that transport fork 26 or the like can engage from above and push cartridges 13 located in guide 21 through the guide. This results in the picture of an elongate cage comprising parallel rails 22 and encompassing fixing rings 27 which leaves a free space over its entire length in the upper area for motion of transport fork 26. The size of the cage is coordinated with the size of the cartridges and selected so that the cartridges cannot tilt when being guided through. In the drawing cartridge 13 is transported in the direction of the arrow with the bottom first and fork 26 embraces fitting 18.

Transport forks 16 are located on transport belt 25 which transports the cartridges through guide 21 via a suitably disposed system of transport rolls 27 to conveyer belt 31, where they fall out of guide 21 and are received by transport elements 32 of conveyer belt 31. From the end of guide 21 transport belt 25 is moved back above bath 2 toward cellular wheel sluice 1, where forks 26 again engage in guide 21 at the intended place and transport the cartridges located in the guide through bath 2. Obviously entire guide 21 extends in the area of the actual cooling stretch in cold bath 2 in such a way that the cartridges are washed by liquid nitrogen on all sides.

I claim:

1. A process for recycling packings selected from cartridges and cans containing polyurethane prepolymers, the process comprising introducing the packings into a cold zone and cooling the packings until the prepolymers contained therein solidify; crushing the packings in the cooled state; dividing the crushed packings into a fraction containing the prepolymers and at least one fraction containing scrap of the packings; introducing the fraction containing the prepolymers into a spray tower simultaneously with a hydroxy compound and optionally a catalyst, the temperature in the spray tower being below the softening temperature of the prepolymers and the hydroxy compound; and bringing the resulting mixture of the prepolymer and the hydroxy compound and the optional catalyst to room temperature or above and reacting the resulting mixture in a reaction zone.

2. The process of claim 1 wherein the temperature in the spray tower is below −80° C.

3. The process of claim 1 wherein the process is performed in the absence of oxygen.

4. The process of claim 1 wherein the packings are cooled with liquid nitrogen.

5. The process of claim 1 wherein the packings are cooled in a cooling stretch.

6. The process of claim 1 wherein the packings are crushed at a temperature below −80° C.

7. The process of claim 1 wherein the prepolymers contained in the packings are pulverized during crushing.

8. The process of claim 7 wherein the hydroxy compound is sprayed into the pulverized prepolymers.

9. The process of claim 1 wherein gaseous or liquid cold nitrogen is sprayed into the spray tower for temperature control.

10. The process of claim 1 wherein the reaction zone is heated with microwaves.

11. The process of claim 1 wherein gases released in the reaction zone are separated by condensation.

12. The process of claim 1 wherein the hydroxy compound is ethylene glycol or a polyether alcohol.

13. The process of claim 1 further comprising introducing additives into the spray tower.

14. The process of claim 1 further comprising introducing additives into the reaction zone.

* * * * *